United States Patent
Lee et al.

(10) Patent No.: US 9,172,426 B2
(45) Date of Patent: Oct. 27, 2015

(54) VOLTAGE MODE DRIVER CIRCUIT FOR N-PHASE SYSTEMS

(71) Applicant: QUALCOMM Incorporated, San Diego, CA (US)

(72) Inventors: Chulkyu Lee, San Diego, CA (US); George Alan Wiley, San Diego, CA (US); Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/199,064

(22) Filed: Mar. 6, 2014

(65) Prior Publication Data
US 2014/0254712 A1     Sep. 11, 2014

Related U.S. Application Data

(60) Provisional application No. 61/774,425, filed on Mar. 7, 2013.

(51) Int. Cl.
| | |
|---|---|
| *H04B 3/00* | (2006.01) |
| *H04L 25/00* | (2006.01) |
| *H04B 3/06* | (2006.01) |
| *G06F 13/40* | (2006.01) |

(52) U.S. Cl.
CPC .............. *H04B 3/06* (2013.01); *G06F 13/4072* (2013.01); *Y02B 60/1228* (2013.01); *Y02B 60/1235* (2013.01)

(58) Field of Classification Search
CPC ......... H04B 3/06; H04L 5/20; H04L 25/4917
USPC .......................................... 375/257, 286, 288
See application file for complete search history.

(56) References Cited

U.S. PATENT DOCUMENTS

| | | | |
|---|---|---|---|
| 3,898,620 A | * | 8/1975 | Leterrier ........................ 710/316 |
| 2006/0034388 A1 | | 2/2006 | Mizuguchi et al. |
| 2007/0160155 A1 | | 7/2007 | Choi |
| 2008/0212709 A1 | * | 9/2008 | Wiley ............................ 375/286 |
| 2013/0114747 A1 | * | 5/2013 | Schoenborn ................... 375/257 |

FOREIGN PATENT DOCUMENTS

EP          1284545 A1     2/2003

OTHER PUBLICATIONS

International Search Report and Written Opinion—PCT/US2014/021994—ISA/EPO—Aug. 6, 2014.

* cited by examiner

*Primary Examiner* — Qutbuddin Ghulamali
(74) *Attorney, Agent, or Firm* — Loza & Loza, LLP

(57) ABSTRACT

System, methods and apparatus are described that facilitate transmission of data, particularly between two devices within electronic equipment. Transmission lines are selectively terminated in an N-phase polarity encoded transmitter when the transmission lines would otherwise be undriven. Data is mapped to a sequence of symbols to be transmitted on a plurality of wires. The sequence of symbols is encoded in three signals. Each of the three terminals may be driven such that transistors are activated to couple a terminal to first and second voltage levels through a pair of impedances when the terminal would otherwise be undriven. The terminal is then pulled toward an intermediate voltage level while the terminal presents a desired impedance level to a transmission line.

28 Claims, 13 Drawing Sheets

VOLTAGE MODE DRIVER CIRCUIT FOR N-PHASE SYSTEMS

CROSS-REFERENCE TO RELATED APPLICATIONS

This application claims priority to and the benefit of provisional patent application No. 61/774,425 filed in the U.S. Patent Office on Mar. 7, 2013, the entire content of which is incorporated herein by reference.

BACKGROUND

1. Field

The present disclosure relates generally to high-speed data communications, and more particularly, to asymmetric communications between components of electronic devices and in particular to multi-phase encoding and decoding.

2. Background

High-speed interfaces are frequently used between circuits and components of mobile wireless devices and other complex apparatus. For example, certain devices may include processing, communications, storage and/or display devices that interact with one another through communications links. Some of these devices, including synchronous dynamic random access memory (SDRAM), may be capable of providing or consuming data and control information at processor clock rates. Other devices, such as display controllers, may require variable amounts of data at relatively low video refresh rates.

High-speed interfaces are often limited by clock skew and are subject to interference. High frequency signals are often transmitted using differential interfaces to provide common-mode rejection for critical signals. In devices such as memory devices, which transmit and receive large amounts of data over wide data and control buses, interfaces maybe expensive and may consume significant power and real-estate on a circuit board.

SUMMARY

Embodiments disclosed herein provide systems, methods and apparatus for communicating between two devices that may be collocated in an electronic apparatus and communicatively coupled through one or more data links.

In an aspect of the disclosure, a method for data transfer includes mapping data to a sequence of symbols to be transmitted on a plurality of wires, encoding the sequence of symbols in three signals, and driving each of three terminals in accordance with one of the three signals. Each of the three signals may be in one of three phases for each symbol to be transmitted. The three signals are in different phases from one another during transmission of each symbol. Driving each of the three terminals may include turning on a first transistor and turning off a second transistor when a corresponding one of the three signals is in a first phase, such that the terminal is driven towards a first voltage level when the first transistor is turned on. Driving each of the three terminals may include turning on the second transistor and turning off the first transistor when the corresponding one of the three signals is in a second phase, such that the terminal is driven towards a second voltage level when the second transistor is turned on. Driving each of the three terminals may include turning off the first transistor and the second transistor when the corresponding one of the three signals is in a third phase.

In an aspect of the disclosure, the terminal drifts towards a third voltage level when both the first transistor and the second transistor is turned off The third voltage level may lie within a voltage range bounded by the first voltage level and the second voltage level.

In an aspect of the disclosure, driving each of the three terminals includes turning on a third transistor and turning on a fourth transistor when the corresponding one of the three signals is in a third phase. The terminal is pulled towards a third voltage level when the third transistor is turned on and the fourth transistor is turned on. The third voltage level lies within a voltage range bounded by the first voltage level and the second voltage level. The third transistor and the fourth transistor may be turned off when the corresponding one of the three signals is in the first phase or in the second phase. Turning on the third transistor causes the corresponding terminal to be coupled to the first voltage through a first impedance, and turning on the fourth transistor causes the corresponding terminal to be coupled to the second voltage through a second impedance. The first impedance and the second impedance may be selected to provide a desired impedance at the terminal.

In an aspect of the disclosure, information is encoded in phase rotation at each transition between symbols in the sequence of symbols. For each transmitted symbol, two signals of the three signals are in the first phase or the second phase, and information may be encoded in the relative polarity of these two signals.

In an aspect of the disclosure, an apparatus includes means for mapping data to a sequence of symbols to be transmitted on a plurality of wires, means for encoding the sequence of symbols in three signals, and means for driving each of three terminals in accordance with a corresponding one of the three signals. Each of the three signals is in one of three phases for each symbol to be transmitted. The three signals are in different phases from one another during transmission of each symbol. The means for driving the each of the three terminals may be configured to turn on a first transistor and turn off a second transistor when a corresponding one of the three signals is in a first phase, such that the corresponding terminal is driven towards a first voltage level when the first transistor is turned on; turn on the second transistor and turn off the first transistor when the corresponding one of the three signals is in a second phase, such that the corresponding terminal is driven towards a second voltage level when the second transistor is turned on; and turn off the first transistor and the second transistor when the corresponding one of the three signals is in a third phase.

In an aspect of the disclosure, a transmitter includes a processing circuit configured to map data to a sequence of symbols to be transmitted on a plurality of wires and encode the sequence of symbols in three signals, and a line driver configured to drive one of three terminals in accordance with one of the three signals. Each of the three signals is in one of three phases for each transmitted symbol. The signals are in different phases from one another during transmission of each symbol. Driving one of the three terminals during each symbol interval may include one of turning on a first transistor and turning off a second transistor when a corresponding one of the three signals is in a first phase, such that the corresponding terminal is driven towards a first voltage level when the first transistor is turned on; turning on the second transistor and turning off the first transistor when the corresponding one of the three signals is in a second phase, such that the corresponding terminal is driven towards a second voltage level when the second transistor is turned on; and turning off the first transistor and the second transistor when the corresponding one of the three signals is in a third phase.

In an aspect of the disclosure, a processor-readable storage medium stores or maintains one or more instructions. When executed by at least one processing circuit, the instructions may cause the at least one processing circuit to map data to a sequence of symbols to be transmitted on a plurality of wires, encode the sequence of symbols in three signals, and drive each of three terminals in accordance with one of the three signals. Each of the three signals may be in one of three phases for each symbol to be transmitted. The signals may be in different phases from one another during transmission of each symbol. For each terminal, the terminal may be driven by turning on a first transistor and turning off a second transistor when a corresponding one of the three signals is in a first phase, such that the terminal is driven towards a first voltage level when the first transistor is turned on; turning on the second transistor and turning off the first transistor when the corresponding one of the three signals is in a second phase, such that the terminal is driven towards a second voltage level when the second transistor is turned on; and turning off the first transistor and the second transistor when the corresponding one of the three signals is in a third phase.

DETAILED DESCRIPTION

Figure 1:
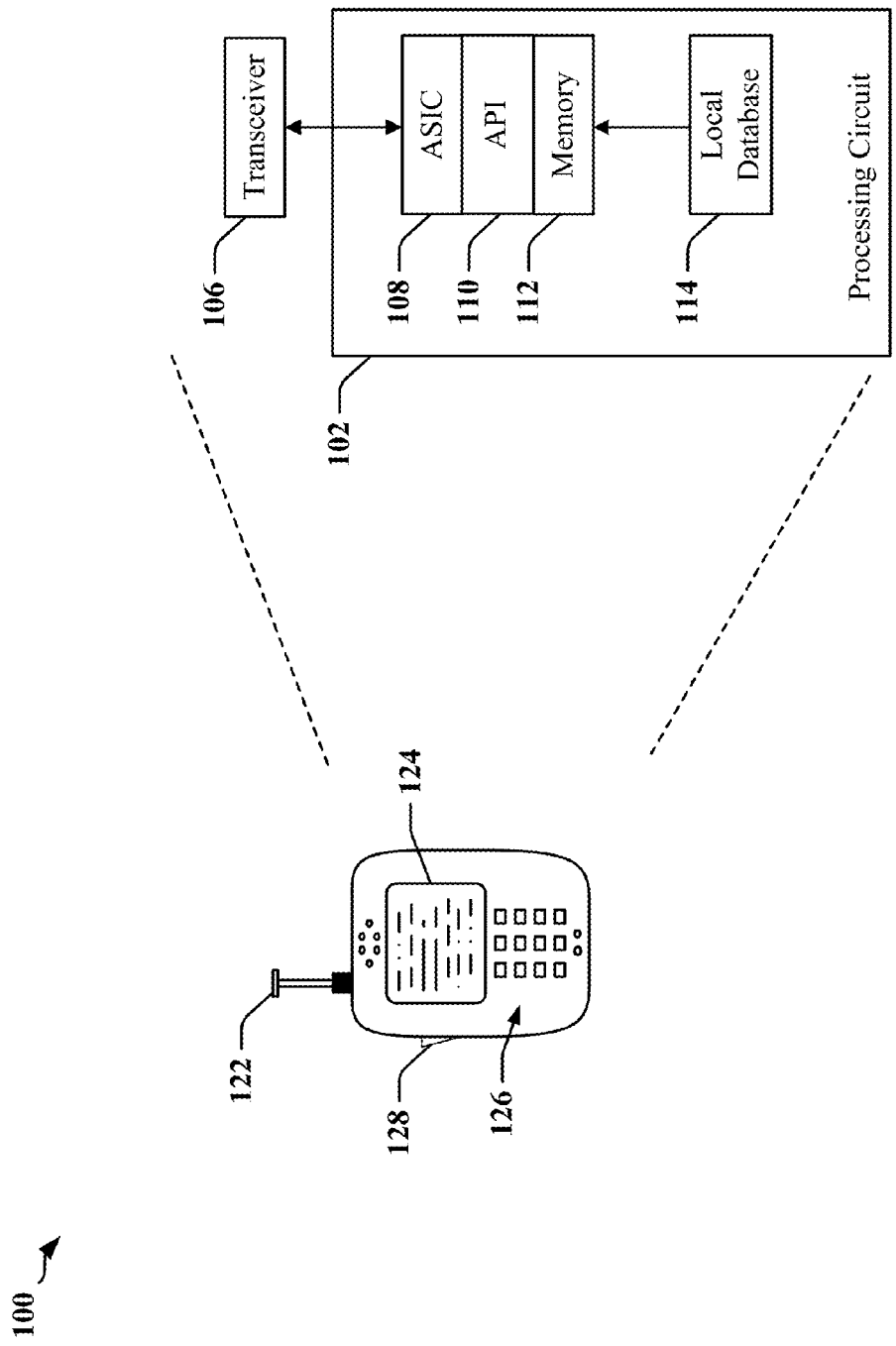
FIG. 1 depicts an apparatus that employs an N-phase polarity encoded data link between devices within the apparatus.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain disclosed examples relate to systems and apparatus that employ multi-phase data encoding and decoding methods involving a plurality of conductors (i.e., M conductors or wires). The M conductors typically include three or more conductors, and each conductor may be referred to as a wire, although the M conductors may include conductive traces on a circuit board or within a conductive layer of a semiconductor integrated circuit (IC) device. The M conductors may be divided into a plurality of transmission groups, each group encoding a portion of a block of data to be transmitted. An N-phase encoding scheme is defined in which bits of data are encoded in phase transitions and polarity changes on the M conductors. In one example, an N-phase encoding scheme for a 3-wire system may include three phase states and two polarities, providing 6 states and 5 possible transitions from each state. Deterministic voltage and/or current changes may be detected and decoded to extract data from the M conductors. Decoding does not rely on independent conductors, or pairs of conductors and timing information can be derived directly from phase and/or polarity transitions in the M conductors. N-Phase polarity data transfer can be applied to any signaling interface, such as electrical, optical and radio frequency (RF) interfaces, for example.

Certain aspects of the invention may be applicable to communications links deployed between electronic components, which may include subcomponents of devices such as telephones, mobile computing devices, appliances, automobile electronics, avionics systems, etc. Referring to FIG. 1, for example, an apparatus 100 employing M-wire, N-phase encoding may include a processing circuit 102 that is configured to control operation of the apparatus 100. The processing circuit 102 may access and execute software applications and control logic circuits and other devices within the apparatus 100. In one example, the apparatus 100 may include a wireless communication device that communicates through an RF communications transceiver 106 with a radio access network (RAN), a core access network, the Internet and/or another network. The communications transceiver 106 may be operably coupled to a processing circuit 102. The processing circuit 102 may include one or more IC devices, such as an application specific IC (ASIC) 108. The ASIC 108 may include one or more processing devices, logic circuits, and so on. The processing circuit 102 may include and/or be coupled to processor readable storage 112 that may maintain instructions and data the may be executed by processing circuit 102. The processing circuit 102 may be controlled by one or more of an operating system and an application programming interface (API) 110 layer that supports and enables execution of software modules residing in the storage 112 of the wireless device. The storage 112 may include read-only memory (ROM) or random-access memory (RAM), electrically erasable programmable read-only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
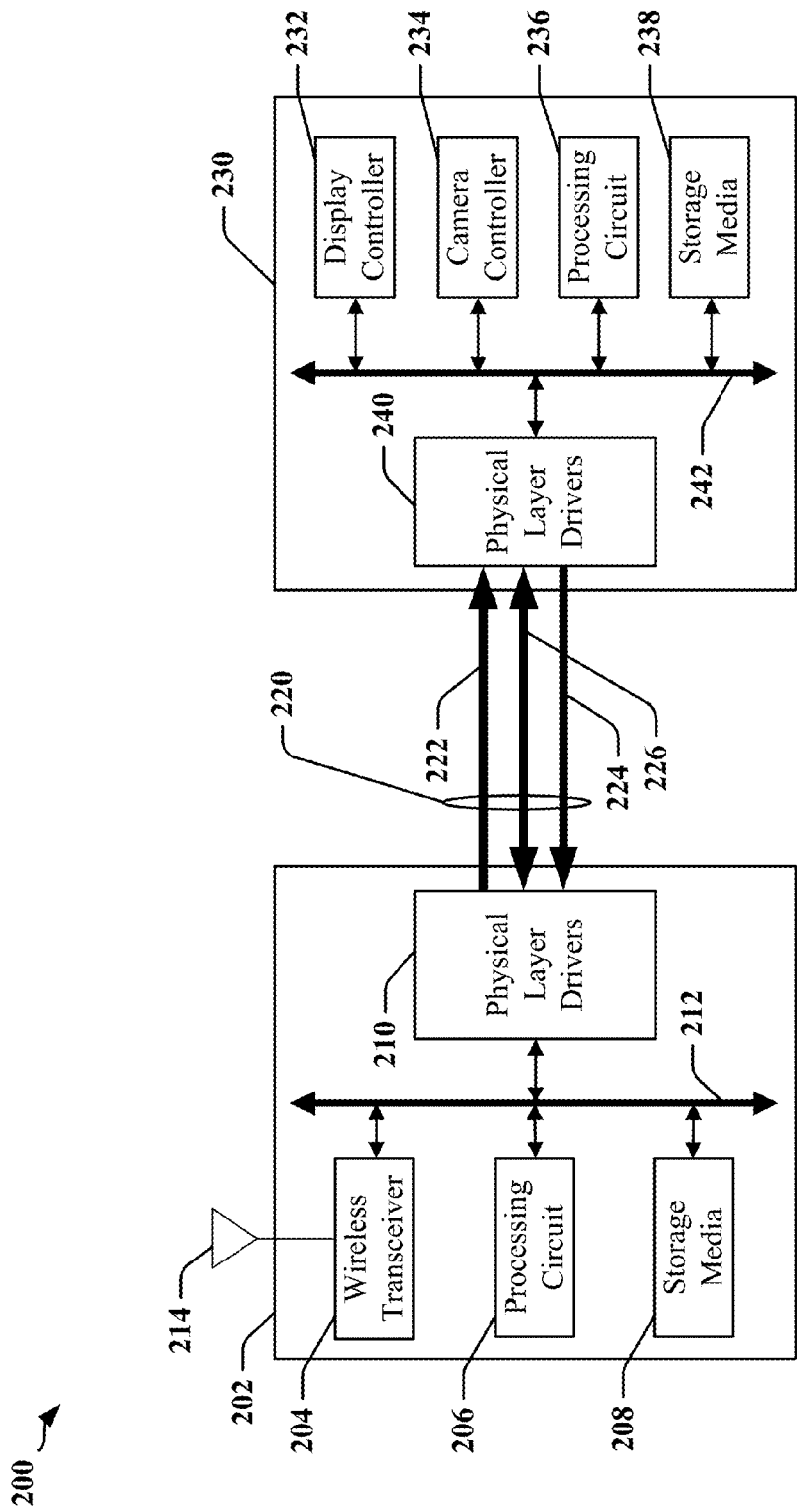
FIG. 2 illustrates a system architecture for an apparatus employing an N-phase polarity encoded data link.

FIG. 2 is a block schematic illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may include a plurality of IC devices 202 and 230 that exchange data and control information through a communications link 220. The communications link 220 may be used to connect the IC devices 202 and 230, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. A portion of the communications link 220 may include a cable or an optical connection.

The communications link 220 may include multiple channels 222, 224 and 226. One or more channel 226 may be bidirectional, and may operate in half-duplex mode and/or full-duplex mode. One or more channels 222, 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host, master and/or transmitter, while the second IC device 230 may be designated as a client, slave and/or receiver, even if both IC devices 202 and 230 are configured to transmit and receive on the communications link 220. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator and so on. The storage media 208 and 238 may include transitory and/or non-transitory storage devices adapted to maintain instructions and data used by the respective processing circuits 206 and 236, and/or other components of the IC devices 202 and 230. Communication between each processing circuit 206, 236 and its corresponding storage media 208 and 238 and other modules and circuits may be facilitated by one or more buses 212 and 242, respectively.

The reverse link 224 may be operated in the same manner as the forward link 222. The forward link 222 and the reverse link 224 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In certain examples, the reverse link 224 derives a clocking signal from the forward link 222 for synchronization purposes, for control purposes, to facilitate power management and/or for simplicity of design. The clocking signal may have a frequency that is obtained by dividing the frequency of a symbol clock used to transmit signals on the forward link 222. The symbol clock may be superimposed or otherwise encoded in symbols transmitted on the forward link 222. The use of a clocking signal that is a derivative of the symbol clock allows fast synchronization of transmitters and receivers (transceivers) and enables fast start and stop of data signals without the need for framing to enable training and synchronization.

In certain examples, a single bidirectional link 226 may support communications between first IC device 202 and the second IC device 230. In some instances, the first IC device 202 and the second IC device 230 provide encoding and decoding of data, address and control signals transmitted between a processing device and memory devices such as dynamic random access memory (DRAM).

In one example, one or more of buses 212 and/or 242 may provide access to double data rate (DDR) SDRAM using M-wire, N-phase encoding technique. N-phase polarity encoding devices 210 and/or 240 can encode multiple bits per transition, and multiple sets of wires can be used to transmit and receive data from the SDRAM, control signals, address signals, and so on.

In another example, the communications link 220 includes a high-speed digital interface, such as a mobile display digital interface (MDDI), and one or more data links 222, 224 and 226 may use N-phase polarity encoding. Transceivers may encode and decode data transmitted on the communications link 220. The use of N-phase polarity encoding provides for high speed data transfer and may consume half or less of the power of other interfaces because fewer drivers are active in N-phase polarity encoded communications links 220. N-phase polarity encoding devices 210 and/or 240 can encode multiple bits per transition on the interface, which may include a bus. In one example, a combination of 3-phase and polarity encoding may be used to support a wide video graphics array (WVGA) 80 frames per second LCD driver IC without a frame buffer, delivering pixel data at 810 Mbps for display refresh.

According to certain aspects disclosed herein, characteristics of an M-wire, N-phase polarity communications link may be dynamically modified to accommodate changing operational requirements and circumstances. For example, the number of wires used to transmit an N-phase signal may be increased to obtain a higher available bandwidth and/or the number of wires used to transmit an N-phase signal may be decreased to reduce power consumption by the IC devices 202 and 230. The number of wires used to transmit an N-phase signal in one direction may be adapted independently of the number of wires used to transmit an N-phase signal in the other direction. Receiving circuits and transmitting circuits in the physical layer drivers (e.g. N-phase polarity encoding devices 210 and 240) may be configured using control information transmitted when the communications link 220 is activated after hibernation or power-on. The control information may be transmitted according to a predefined protocol, whereby a minimum number of wires are activated to carry a control message specifying the configuration of the communications link 220, for example. The control message may alternatively or additionally be transmitted with a shutdown command, a wakeup command, and/or in a preamble preceding each transmission. In some examples, the configuration of the communications link 220 may be determined during a training and/or synchronization sequence, whereby the receiving physical layer drivers (e.g., N-phase polarity encoding devices 210 or 240) monitors the available wires or other conductors for transitions corresponding to an N-phase signal, in order to determine which wires/conductors are active.

Figure 3:
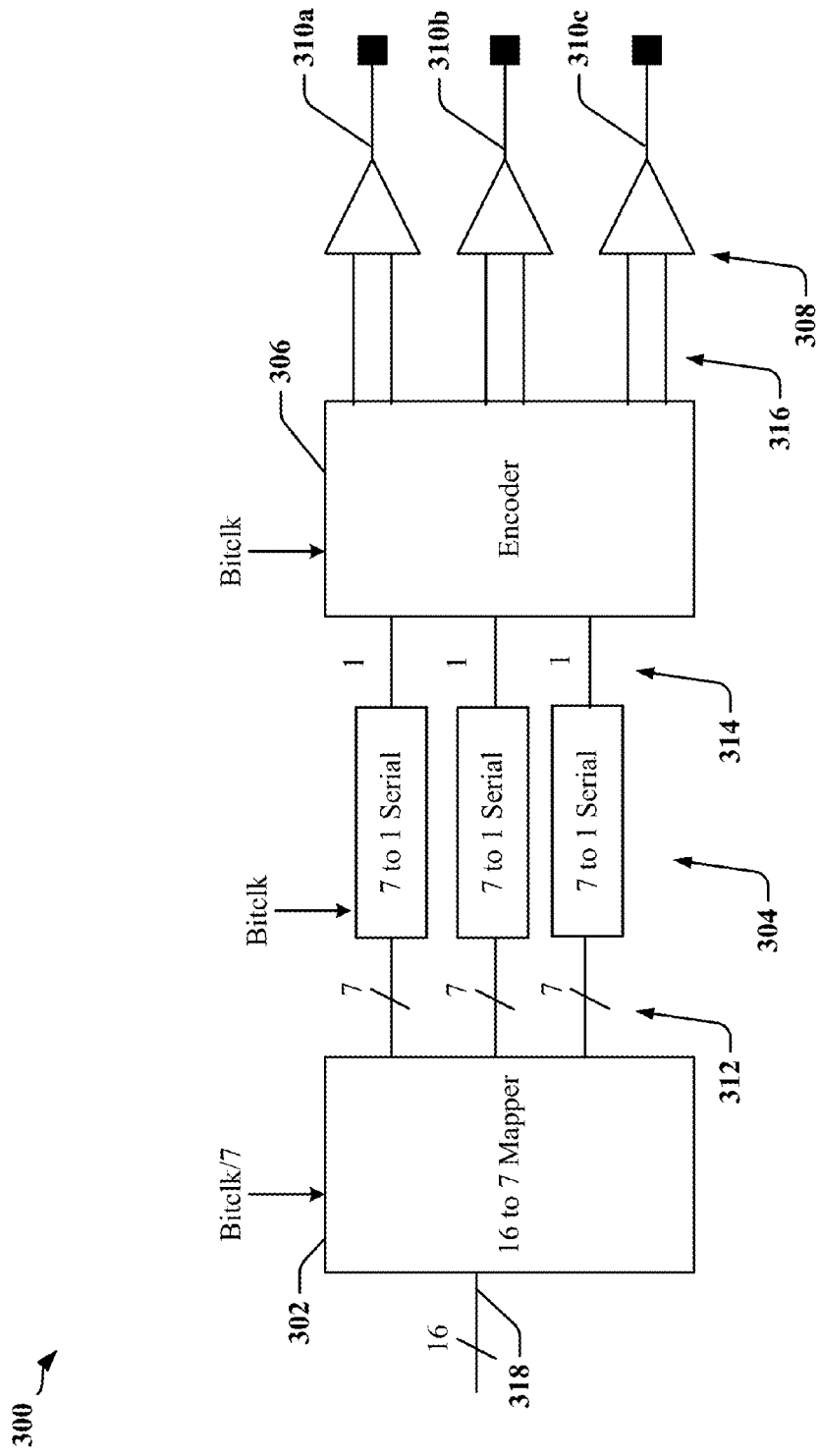
FIG. 3 illustrates an example of an N-phase polarity data encoder.

FIG. 3 is a diagram 300 illustrating an example of an M-wire, N-phase polarity encoding transmitter configured for M=3 and N=3. The example of 3-wire, 3-phase encoding is selected solely for the purpose of simplifying descriptions of certain aspects of this disclosure. The principles and techniques disclosed for 3-wire, 3-phase encoders can be applied in other configurations of M-wire, N-phase polarity encoders.

When N-phase polarity encoding is used, connectors such as conductors/signal wires 310a, 310b and 310c on an M-wire bus may be undriven, driven positive, or driven negative. An undriven signal wire 310a, 310b or 310c may be in a high-impedance state. An undriven signal wire 310a, 310b or 310c may be driven to a voltage level that lies substantially halfway between the positive and negative voltage levels provided on driven signal wires. An undriven signal wire 310a, 310b or 310c may have no current flowing through it. In the example illustrated in FIG. 3, each signal wire 310a, 310b and 310c may be in one of three states (denoted as +1, −1, and 0) using drivers 308. In one example, drivers 308 may include unit-level current-mode drivers. In another example, drivers 308 may drive opposite polarity voltages on two signals 310a and 310b while the third signal 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each pair of consecutive symbol transmission intervals, at least one signal wire 310a, 310b or 310c has a different state in the two symbol transmission intervals.

In the example depicted in FIG. 3, 16-bit data 318 is input to a mapper 302, which maps the input data 318 to 7 symbols 312 for transmitting sequentially over the signal wires 310a, 310b and 310c. The 7 symbols 312 may be serialized, using parallel-to-serial converters 304 for example. An M-wire, N-phase encoder 306 receives 7 symbols 312 produced by the mapper one symbol at a time and computes the state of each signal wire 310a, 310b and 310c for each symbol interval. The encoder 306 selects the states of the signal wires 310a, 310b and 310c based on the input symbol and the previous states of signal wires 310a, 310b and 310c.

The use of M-wire, N-phase encoding permits a number of bits to be encoded in a plurality of symbols where the bits per symbol is not an integer. In the simple example of a 3-wire system, there are 3 available combinations of 2 wires that may be driven simultaneously, and 2 possible combinations of polarity on the pair of simultaneously driven wires, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
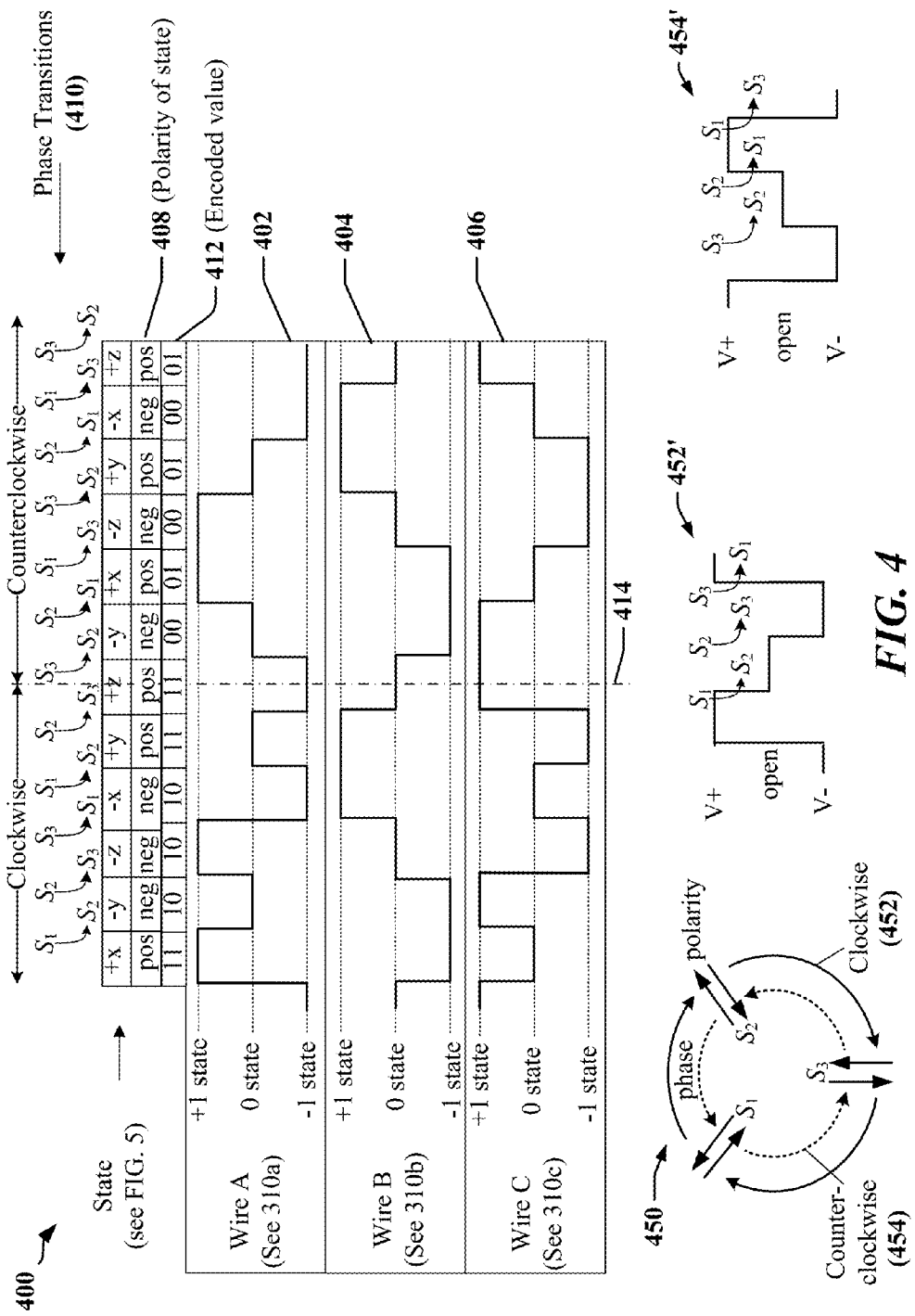
FIG. 4 illustrates signaling in an N-phase polarity encoded interface.

FIG. 4 illustrates an example of signaling 400 employing a three-phase modulation data-encoding scheme based on the circular state transition diagram 450. According to the data-encoding scheme, a three-phase signal may rotate in two directions and may be transmitted on three conductors 310a, 310b and 310c. Each of the three signals is independently driven on the conductors 310a, 310b, 310c. Each of the three signals includes the three-phase signal, with each signal on each conductor 410a, 410b and 410c being 120 degrees out of phase relative to the signals on the other two conductors 410a, 410b and 410c. At any point in time, each of the three conductors 310a, 310b, 310c is in a different one of the states {+1, 0, −1}. At any point in time, each of the three conductors 310a, 310b, 310c in a 3-wire system is in a different state than the other two wires. When more than three conductors or wires are used, two or more pairs of wires may be in the same state. The illustrated encoding scheme also encodes information in the polarity of the two conductors 310a, 310b and/or 310c that are actively driven to the +1 and −1 states. Polarity is indicated at 408 for the sequence of states depicted.

At any phase state in the illustrated three-wire example, exactly two of the conductors 310a, 310b, 310c carry a signal which is effectively a differential signal for that phase state, while the third conductor 310a, 310b or 310c is undriven. The phase state for each conductor 310a, 310b, 310c may be determined by voltage difference between the conductor 310a, 310b or 310c and at least one other conductor 310a, 310b and/or 310c, or by the direction of current flow, or lack of current flow, in the conductor 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a three-wire, three-phase communications link, clockwise rotations ($S_1$ to $S_2$), ($S_2$ to $S_3$), and/or ($S_3$ to $S_1$) at a state transition may be used to encode a logic 1, while counter-clockwise rotations ($S_1$ to $S_3$), ($S_3$ to $S_2$), and/ or ($S_2$ to $S_1$) at the state transition may be used to encode a logic 0. Accordingly a bit may be encoded at each transition by controlling whether the signal is "rotating" clockwise or counter-clockwise. For example, a logic 1 may be encoded when the three wires 310a, 310b, 310c transition from phase state $S_1$ to phase state $S_2$ and a logic 0 may be encoded when the three wires 310a, 310b, 310c transition from phase state $S_1$ to phase state $S_3$. In the simple three-wire example depicted, direction of rotation may be easily determined based on which of the three wires 310a, 310b, 310c is undriven before and after the transition.

Information may also be encoded in the polarity of the driven conductors 310a, 310b, 310c or direction of current flow between two conductors 310a, 310b, 310c. Signals 402, 404, and 406 illustrate voltage levels applied to conductors 310a, 310b, 310c, respectively at each phase state in a three-wire, three-phase link. At any time, a first conductor 310a, 310b, 310c is coupled to a positive voltage (+V, for example), a second conductor 310a, 310b, 310c is coupled to a negative voltage (−V, for example), while the third conductor 310a, 310b, 310c may be open-circuited or otherwise undriven. As such, one polarity encoding state may be determined by the current flow between the first and second conductors 310a, 310b, 310c or the voltage polarities of the first and second conductors 310a, 310b, 310c. In some embodiments, two bits of data may be encoded at each phase transition. A decoder may determine the direction of signal phase rotation to obtain the first bit, and the second bit may be determined based on the polarity difference between two of the signals 402, 404 and 406. The decoder having determined direction of rotation can determine the current phase state and the polarity of the voltage applied between the two active connectors 310a, 310b and/or 310c, or the direction of current flow through the two active conductors 310a, 310b and/or 310c.

In the example of the three-wire, three-phase link described herein, one bit of data may be encoded in the rotation, or phase change in the three-wire, three-phase link, and an additional bit may be encoded in the polarity of two driven wires. Certain embodiments, encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

Figure 5:
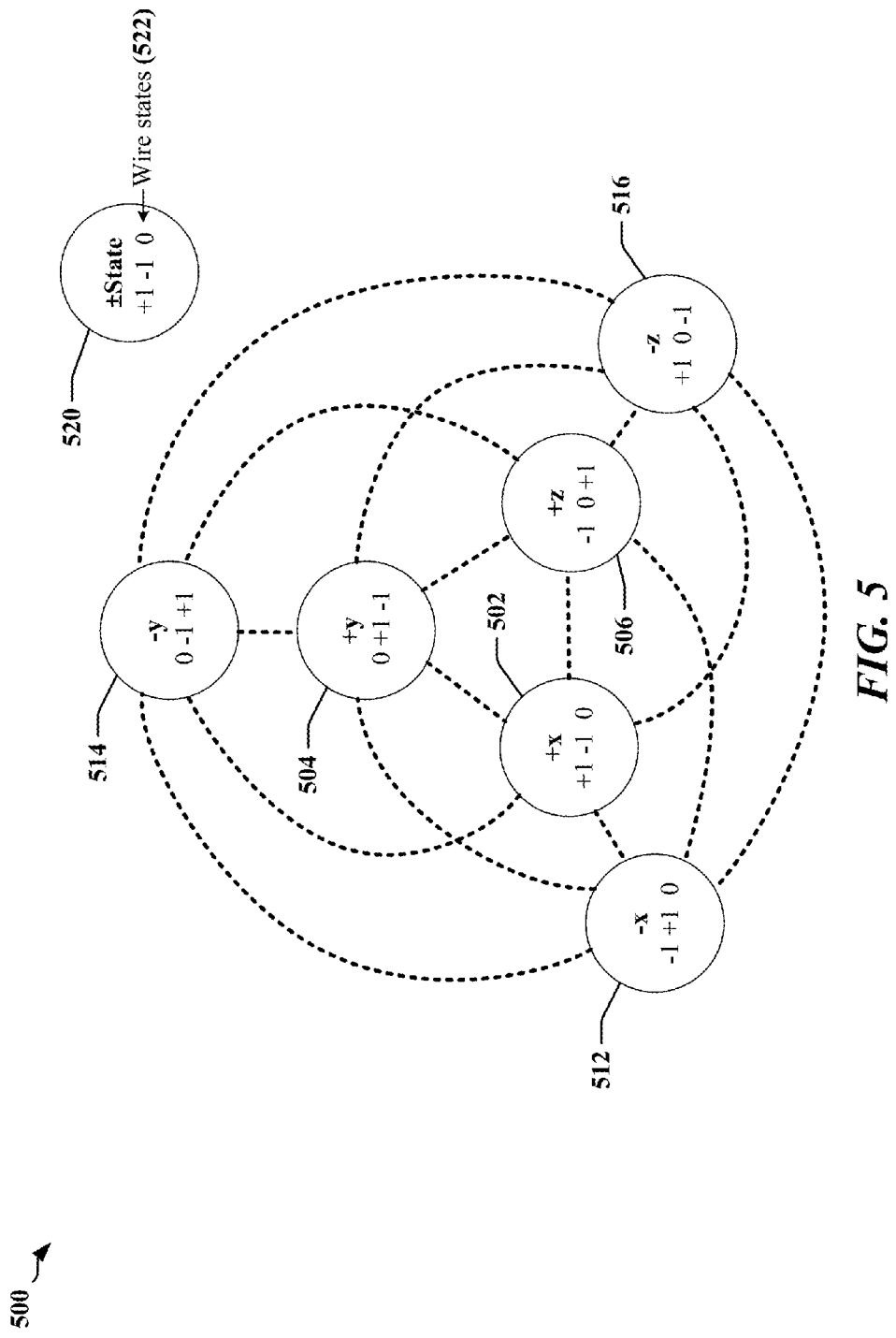
FIG. 5 is a state diagram illustrating state transitions in the example of a 3-wire, 3-phase communication link.

FIG. 5 is a state diagram 500 illustrating 6 states and 30 possible state transitions in the example of a 3-wire, 3-phase communication link. FIG. 5 expands on the state transition diagram 450 in FIG. 4 by depicting all possible states 502, 504, 506, 512, 514 and 516. These states 502, 504, 506, 512, 514 and 516 include positive polarity and negative polarity versions of the phase states $S_1$, $S_2$ and $S_3$ illustrated in the phase transition diagram 450 of FIG. 4. For clarity, the set of phase/polarity states are labeled alphabetically and includes {+x, −x, +y, −y, +z, −z} where, for example, +x and −x represent states with the same phase state but different polarity. As shown in the model state element 520, each state 502, 504, 506, 512, 514 and 516 in the state diagram 500 includes a field of wire states 522 that show the voltage state of signals 402, 404 and 406, which are transmitted on wires 310a, 310b and 310c, respectively. For example, in state 502 (+x) signal 402=+1, signal 404=−1 and signal 406=0. Also shown in FIG. 5 are the 5 possible transition paths between the states 502, 504, 506, 512, 514 and 516, including by way of example, the transition path 524 between −x state 512 and −y state 514.

Figure 6:
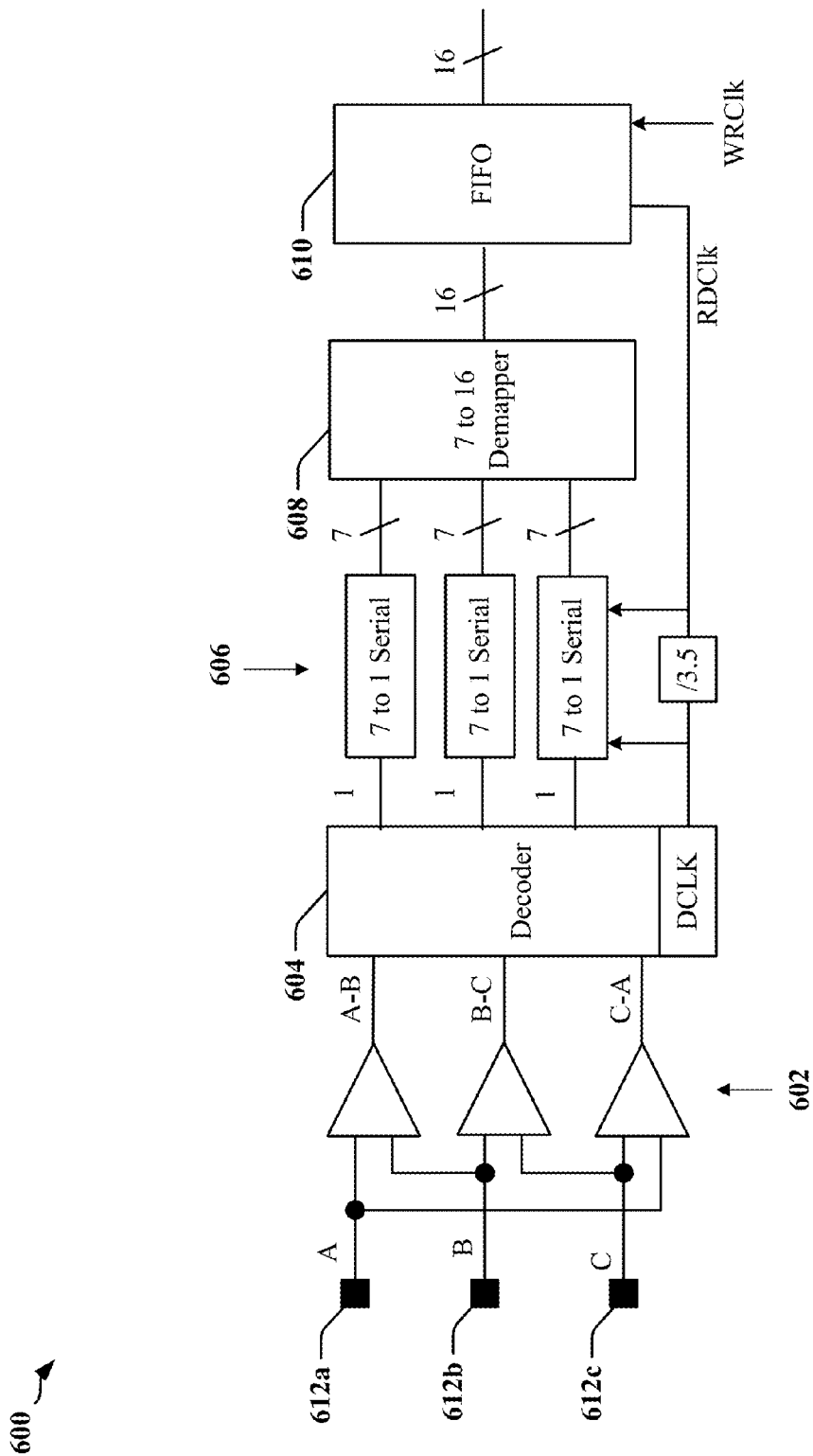
FIG. 6 illustrates a 3-phase polarity data decoder.

FIG. 6 is a block schematic drawing 600 illustrating an example showing certain physical layer (PHY) components in a receiver adapted to connect to a 3-phase interface. Comparators 602 and decoder 604 are configured to provide a digital representation of the state of each of three connectors 612a, 612b and 612c, as well as the change in the state of the three transmission lines compared to the state transmitted in the previous symbol period. As can be seen from the illustrated example, the voltage of each connector 612a, 612b or 612c may be compared to the voltages of the other two connectors 612a, 612b and/or 612c to determine the state of each connector 612a, 612b or 612c, such that the occurrence of a transition may be detected and decoded by the decoder 604 based on the outputs of the comparators 602. Seven consecutive states are assembled by serial to parallel convertors 606, which produce sets of 7 symbols to be processed by demapper 608 to obtain 16 bits of data that may be buffered in the first-in-first-out (FIFO) register 610.

TABLE 1

| State | Wire amplitude | | | Differential Rx output | | | Receiver Digital Output | | |
|---|---|---|---|---|---|---|---|---|---|
| | A | B | C | A − B | B − C | C − A | Rx_AB | Rx_BC | Rx_CA |
| +x | +V | 0 | +V/2 | +V | −V/2 | −V/2 | 1 | 0 | 0 |
| −x | 0 | +V | +V/2 | −V | +V/2 | +V/2 | 0 | 1 | 1 |
| +y | +V/2 | +V | 0 | −V/2 | +V | −V/2 | 0 | 1 | 0 |
| −y | +V/2 | 0 | +V | +V/2 | −V | +V/2 | 1 | 0 | 1 |
| +z | 0 | +V/2 | +V | −V/2 | −V/2 | +V | 0 | 0 | 1 |
| −z | +V | +V/2 | 0 | +V/2 | +V/2 | −V | 1 | 1 | 0 |

With reference also to FIG. 5, Table 1 illustrates the outputs of the comparators 602 for each wire state 522 in the 3-wire 3-Phase Polarity encoding system. In the example, the wire states 522 may be encoded in the voltage amplitude on the three connectors 612a, 612b and 612c such that a +1 state of a wire is represented as a voltage +V volts, a −1 state of the wire is represented as 0 volts and the undriven state is represented or approximated as +V/2 volts. A receiver/decoder may be configured to output a code at the digital output of the receiver for each symbol decoded.

Figure 7:
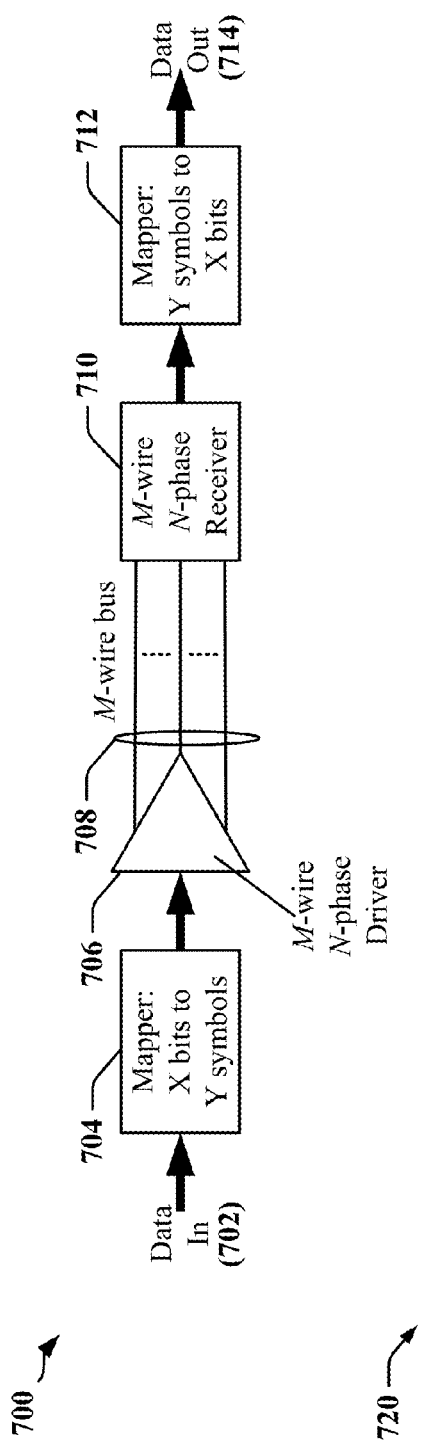
FIG. 7 illustrates a driver for M-wire, N-phase polarity data encoding.

FIG. 7 includes a block schematic diagram 700 illustrating certain aspects of an M-wire, N-phase encoding system and bit encoding capabilities for various values of M and configurations of the M-wire, N-phase encoding system. Data received at a transmitter may be mapped to a number of symbols to be sequentially transmitted over an M-wire bus 708. The mapping scheme may determine a configuration for the M-wire bus 708. In one example, a plurality of connectors in the M-wire bus 708 may carry the same N-phase signal, shifted by a predetermined phase angle. In another example, the M-wire bus 708 may be subdivided into groups of G wires, where each group carries different N-phase signals. In the latter example, a 9-wire bus 708 may be configured as three different 3-wire bus segments. According to certain aspects, the mapper 704 may be adapted to dynamically define the encoding scheme, to reconfigure the M-wire bus 708 and to control the operation of the M-wire, N-phase driver 706. In one example, the mapper 704 may be adapted to reconfigure the M-wire, N-phase encoding system to provide a desired bandwidth and/or to limit power consumption. Thus, the mapper 704 may selectively enable and disable portions of the M-wire bus 708 when demand on data bandwidth is low, and the mapper 704 may enable additional portions of the M-wire bus 708 to obtain increased bandwidth.

At the receiver, N-phase symbols are received and accumulated from the M-wire bus 708, typically over a plurality of transmission clock cycles. The accumulated symbols may then be decoded by a symbol-to-bits mapper 712. Transmit clocks may be derived from one or more portions of the M-wire bus 708 and configuration information may be communicated using a designated group of connectors that provide a primary channel. In the example of the 9-wire bus 708 configured as three different 3-wire bus segments, one bus segment may be identified as the primary channel with a default encoding scheme to be used during power-up and synchronization. Commands communicated over the bus may cause the transmitter and receiver to enter a hibernate stage on one or more of the 3-wire segments.

N-Phase data transfer may use more than three signal wires or other connectors in provided in a communication medium. The use of additional signal wires that can be driven simultaneously provides more combinations of states and polarities and allows more bits of data to be encoded at each transition between states. This can significantly improve throughput of the system, while limiting power consumption as opposed to communications links that use multiple differential pairs to transmit data bits, while providing increased bandwidth. Power consumption can be further limited by dynamically configuring the number of active connectors for each transmission.

Figure 8:
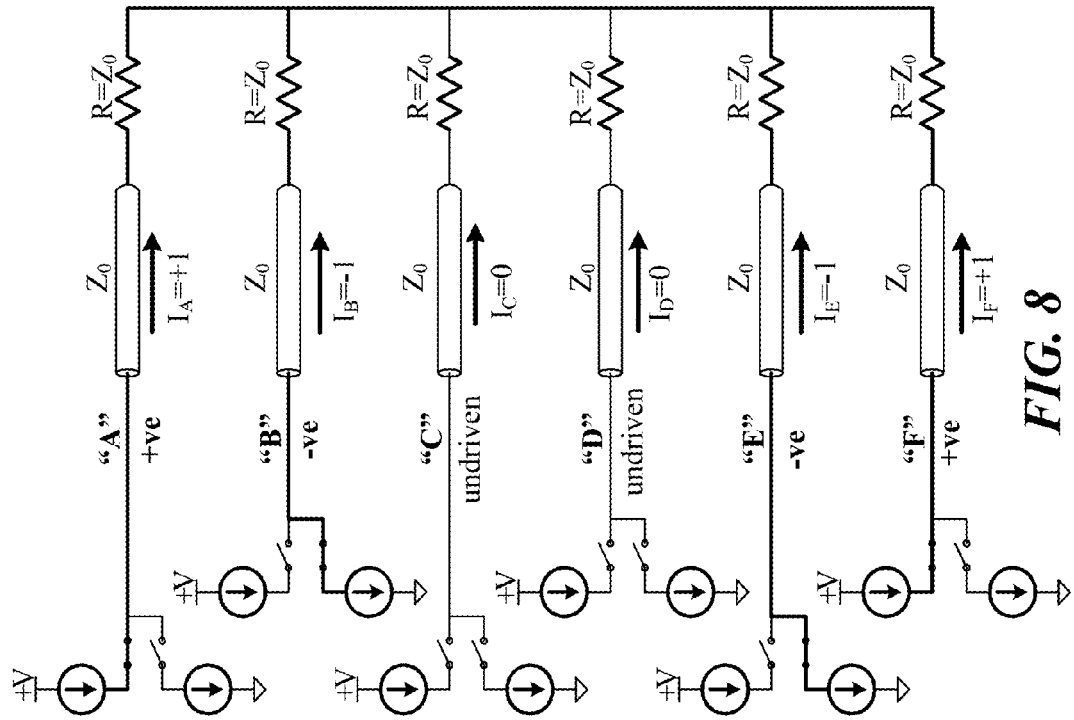
FIG. 8 is a schematic drawing showing a model of an encoder that transmits symbols using 6 wires with 2 pairs of wires driven for each state.

FIG. 8 is a schematic drawing showing a model of an encoder that transmits symbols using 6 wires with 2 pairs of wires driven for each state. The 6 wires may be labeled A through F, such that in one state, wires A and F are driven positive, wires B and E negative, and C and D are undriven (or carry no current). In the example the N-phase signal may have 3 phases. Each phase state can have either a positive or negative polarity. In the illustrative model, each wire may be connected to a positive current source, a negative current source, or no current source. Current flows through a wire having an impedance $Z_0$ that is typically the characteristic impedance of the transmission wire. As shown in FIG. 8, the positive currents are canceled by two negative currents.

For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.
The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| | | | | | |
|---|---|---|---|---|---|
| ++-- | +--+ | +-+- | -+-+ | -++- | --++ |

Accordingly, the total number of different states may be calculated as 15×6=90. To guarantee a transition between successive symbols, 89 states are available for transition from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

FIG. 7 includes a chart 720 that shows bit encoding for various values of M (i.e. number of wires) and configurations of wires and wire pairs.

In some embodiments, an encoder may be configured to increase the number of wires used for N-phase encoding when increased bandwidth is required. Bandwidth may change when, for example, a video clip is to be displayed to a user of apparatus 100, or when a burst of data is to be transferred between processing circuits and/or memory devices. Changes in bandwidth may also correspond or relate to power control measures as well as specific application needs. For example, the apparatus of FIG. 2 may dynamically reconfigure the connectors of a communications link 220 to initiate power-saving measures that may conserve battery lifetime when demand for bandwidth is curtailed.

When increased or decreased bandwidth is required or requested, an encoder may increase or decrease the number of active conductors to be used for N-phase encoding. Such adaptive encoding can enable the power-efficient provision of variable bandwidth. In one example, additional wires can be added in atomic units. An atomic unit may include three wires that employ 3-phase, polarity encoding (described herein). In another example, additional encoding states may be defined by adding pairs of wires to an M-wire, N-phase bus. In another example, additional encoding states may be obtained by adding a single wire, whereby two wires are undriven for each state. Addition of an undriven wire may increase power consumption less than adding a pair of driven wires.

Figure 9:
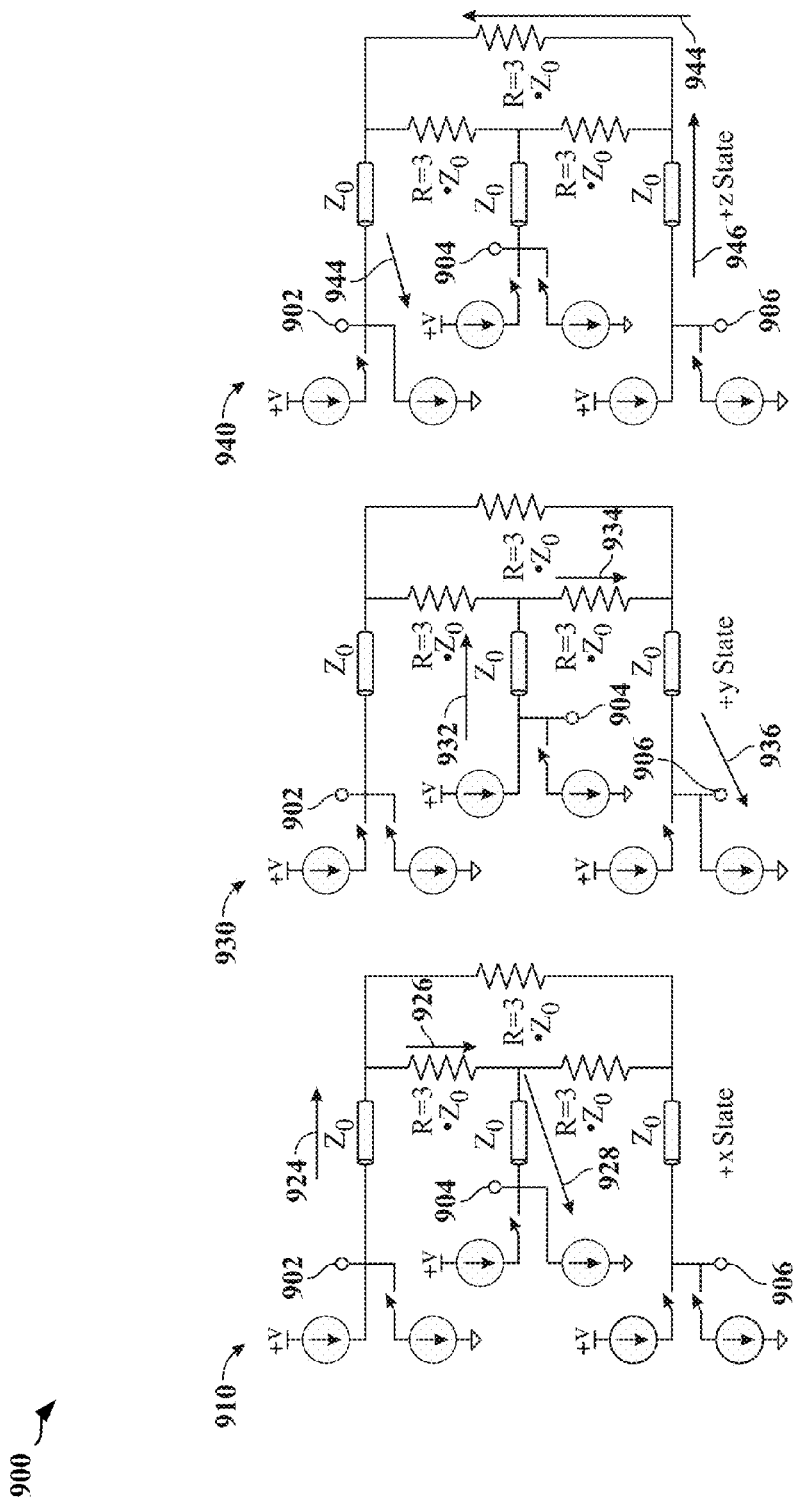
FIG. 9 is a schematic drawing showing a model of a 3-phase polarity encoding circuit.

FIG. 9 illustrates a model of a 3-wire, 3-phase polarity encoding circuit. Current is passed through two of three signal wires through corresponding terminals 902, 904 and/or 906 that may be connected to wires having a characteristic impedance ($Z_O$). No current is passed through the third signal wire. As discussed herein, each phase state can be defined as having a positive polarity or a negative polarity, although the example in FIG. 9 depicts only the positive polarity condition of each phase state to simplify description. To obtain a "+x" state, current is passed 924, 926, 928 from terminal 902 to terminal 904. To obtain a "+y" state, current is passed 934, 936, 938 from terminal 904 to terminal 906. To obtain a "+z" state, current is passed 944, 946, 948 from terminal 906 to terminal 902. The undriven signal may be pulled towards a neutral voltage by termination resistors at the receiver.

According to certain aspects disclosed herein, an M-wire, N-phase physical layer (N-phase PHY) interface is provided to support a multiphase signal. Referring again to FIG. 4, in one example a 3-phase signal 402, 404, 406 provided on a wire 310a, 310b, 310c is defined by two active signals of opposite polarity and one undriven signal in which no current is transmitted and/or the wire 310a, 310b, 310c is open circuited. A 3-phase PHY may encode and decode the 3-phase signal by causing the undriven signal to transition to a neutral voltage (e.g. 0 volts) at both ends of the transmission line circuit to prevent current flow.

Figure 10:
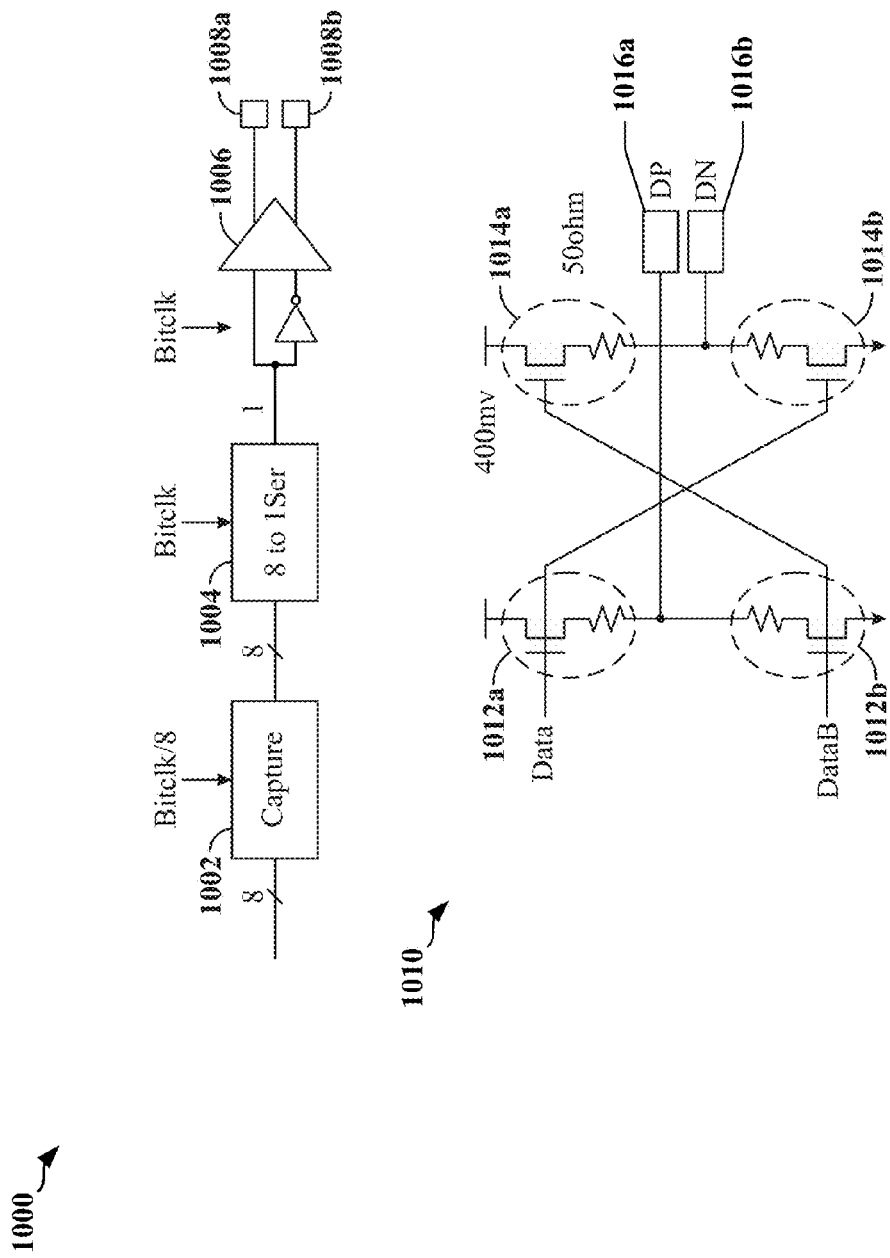
FIG. 10 illustrates a conventional physical layer driver used to transmit differential signals.

Conventional interfaces do not have information encoded in the undriven state. FIG. 10 is a diagram 1000 that illustrates a conventional differential physical layer (DPHY) used to transmit signals. Data bits are captured by a register 1002 or similar device. The data bits may include a byte, word or other grouping of bits. The captured bits are serialized using a shift register 1004 or other parallel-to-serial converter. The shift register 1004 is clocked at the transmission rate of the interface. A differential driver 1006 converts each bit to a differential signal. The differential may drive two signal wires 1008a and 1008b. In one example, the two signal wires 1008a, 1008b may be driven at different voltages, which may have opposite polarities. In another example, a current is passed in one direction or the other between the two wires 1008a and 1008b. In some instances, the driver 1006 may be a tri-state buffer that can be effectively disconnected to enable a different driver (not shown) to drive the wires 1008a and 1008b.

A differential line driver line 1010 may include transistors 1012a, 1012b, 1014a and 1014b configured to provide a pair of signals 1016a and 1016b that are effective inverses of one another for all signaling states. A conventional DPHY does not define an undriven state in which information is encoded based on the state of the undriven state and the state of two or more other wires.

Figure 11:
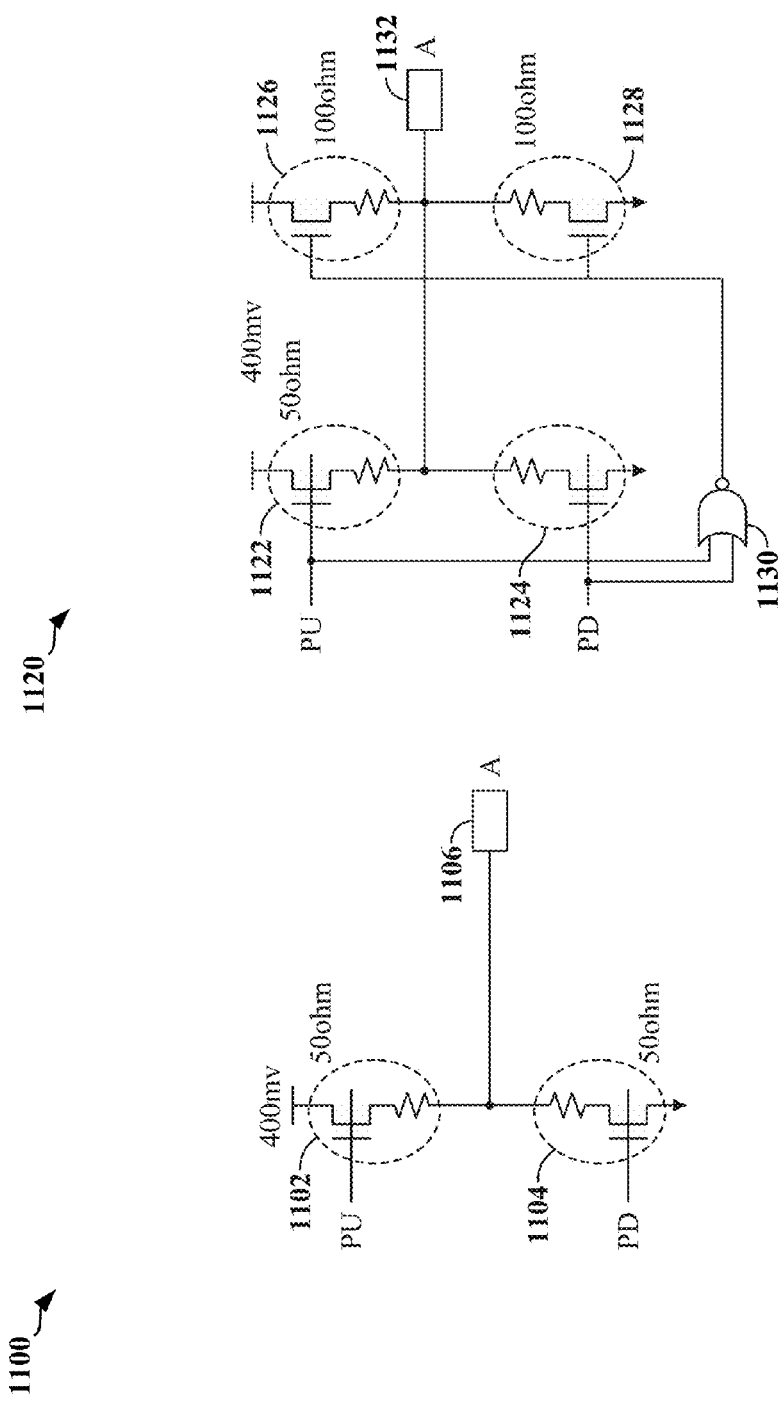
FIG. 11 includes examples of line interfaces used to drive a signal wire in a 3-phase system.

FIG. 11 illustrates examples 1100 and 1120 of line interfaces that may be used to drive a signal wire in a 3-phase PHY. In one example 1100, a transistor 1102 receives a pull-up signal and a transistor 1104 receives a pull-down signal. When the output terminal 1106 is to be driven to an active (+1 or −1) signaling state, one of the transistors 1102 or 1104 is turned on and the output terminal 1106 is actively driven to one signaling state or the other. When the output terminal 1106 is to be undriven and in an inactive (0) signaling state, neither the pull-up or pull-down control is active and both transistors 1102 and 1104 are turned off. The output terminal 1106 typically settles at the common mode level of driven lines when both transistors 1102 and 1104 are turned off to obtain an inactive (0) signaling state. However, the settling time may result in skew times that are longer for undriven states than for states that are actively driven by a transistor 1102 or 1104. The settling time and corresponding skew time may be improved by terminating the transmission line or the terminal 1106. In one example, a pair of impedances, which may be resistive, or other loads may be provided at the transmitter or at the receiver to cause a signal wire or terminal 1106 to more rapidly acquire a neutral voltage level and to maintain the signal wire or terminal 1106 at the neutral voltage.

In a second example 1120, an active termination may be provided to more rapidly settle a wire or other transmission line connected to a terminal 1132 of the driver circuit. In this example, an additional termination circuit includes two termination transistors 1126 and 1128, which are both turned on when neither pull-up transistor 1122 nor pull-down transistor 1124 is turned on; that is to say, when both the pull-up transistor 1122 and the pull-down transistor 1124 are turned off, the two termination transistors 1126 and 1128 are turned on. Detection logic (here, a NOR function) 1130 determines when neither transistor 1122 or 1124 is enabled and the detection logic activates the additional termination transistors 1126 and 1128, thereby causing the transmission wire at the output terminal 1132 to converge more quickly on the 0 state. One of the termination transistors 1126 or 1128 couples the output terminal 1132 through and impedance to the +1 voltage level and the second termination transistor 1128 or 1126 couples the output terminal 1132 through and impedance to the −1 voltage level such that the voltage at the output terminal 1132 is pulled towards the 0 state voltage level. The 0 state is typically defined as a voltage level between the voltage levels of the +1 and −1 states. The impedances associated with the termination transistors 1126 or 1128 may be selected such that terminating circuit matches the characteristic impedance of the signal wire.

Figure 12:
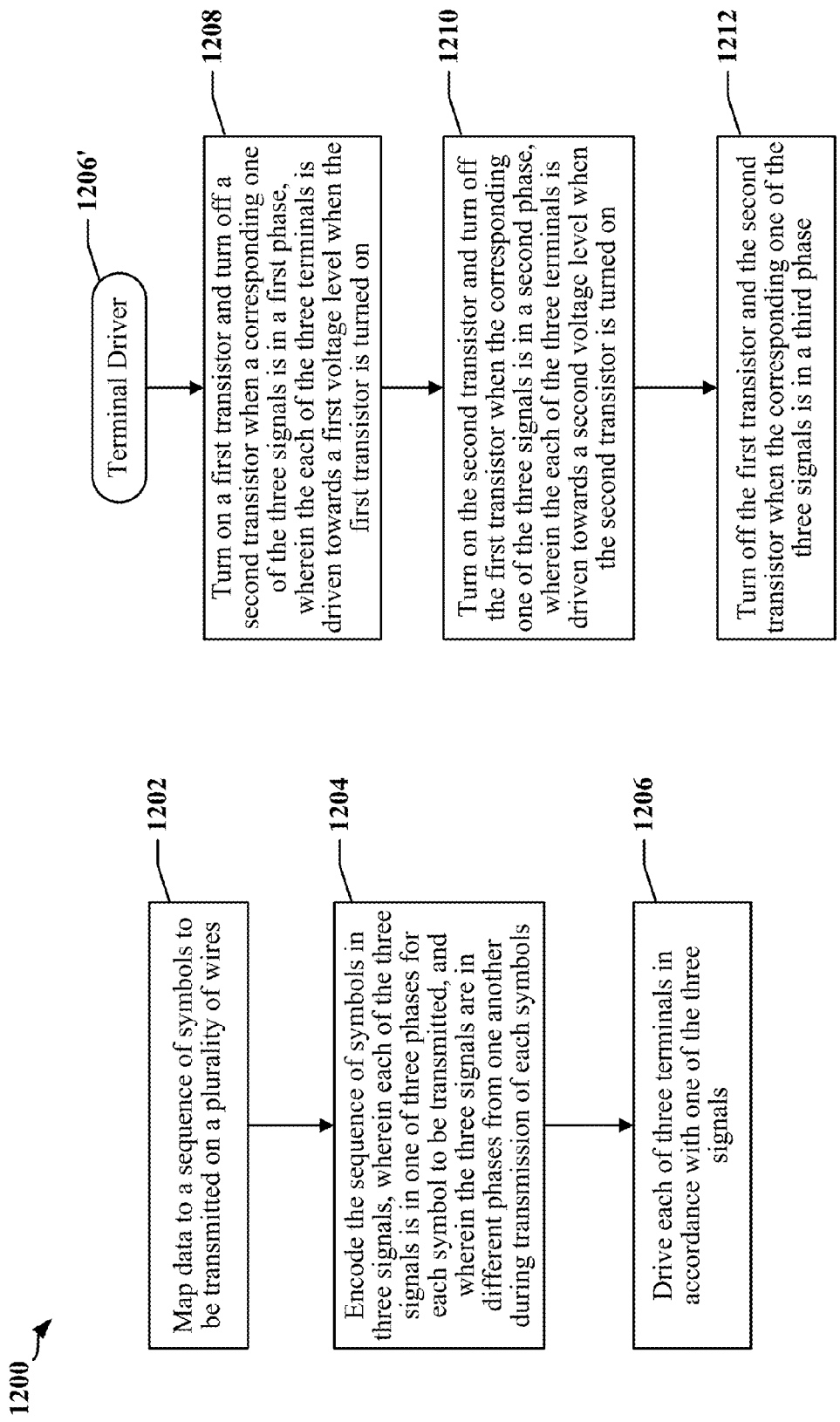
FIG. 12 is a flowchart illustrating a data transfer method.

FIG. 12 is a flowchart illustrating a data transfer method. The data transfer method may involve transmission of a plurality of symbols in multiphase signals. Each symbol may define a phase state for each signal and polarity for certain pairs of signals. The method may be performed by a transmitter.

At step 1202, the transmitter may map data to a sequence of symbols to be transmitted on a plurality of wires.

At step 1204, the transmitter may encode the sequence of symbols in three signals. Each of the three signals may be in one of three phases for each symbol to be transmitted. The three signals may be in different phases from one another during transmission of each symbol.

At step 1206, the transmitter may drive each of three terminals in accordance with one of the three signals.

As shown at 1206', driving the each of the three terminals includes one of a plurality of steps performed for each symbol.

At step 1208, the transmitter may turn on or otherwise activate a first transistor and turn off or otherwise deactivate a second transistor when a corresponding one of the three signals is in a first phase. The corresponding terminal is driven towards a first voltage level when the first transistor is turned on.

At step 1210, the transmitter may turn on or otherwise activate a second transistor and turn off or otherwise deactivate the first transistor when the corresponding one of the three signals is in a second phase. The corresponding terminal is driven towards a second voltage level when the second transistor is turned on.

At step 1212, the transmitter may turn off the first transistor and the second transistor when the corresponding one of the three signals is in a third phase. The corresponding terminal may drift towards a third voltage level when the first transistor is turned off and the second transistor is turned off The third voltage level may lie within a voltage range bounded by the first voltage level and the second voltage level. The third transistor and the fourth transistor may be turned off when the corresponding one of the three signals is in the first phase or in the second phase.

According to certain aspects disclosed herein, driving each of the three terminals may include turning on a third transistor and turning on a fourth transistor when the corresponding one of the three signals is in a third phase. The corresponding terminal is pulled towards a third voltage level when the third transistor is turned on and the fourth transistor is turned on. The third voltage level may lie within a voltage range bounded by the first voltage level and the second voltage level. Turning on the third transistor may cause a terminal to be coupled to the first voltage through a first impedance, and turning on the fourth transistor may cause the terminal to be coupled to the second voltage through a second impedance. The first impedance and the second impedance may be selected to provide a desired impedance at a terminal.

According to certain aspects disclosed herein, information may be encoded in phase rotation at each transition between symbols in the sequence of symbols. Two signals of the three signals may be in the first phase or the second phase for each symbol to be transmitted, and information may be encoded in relative polarity of the two signals.

Figure 13:
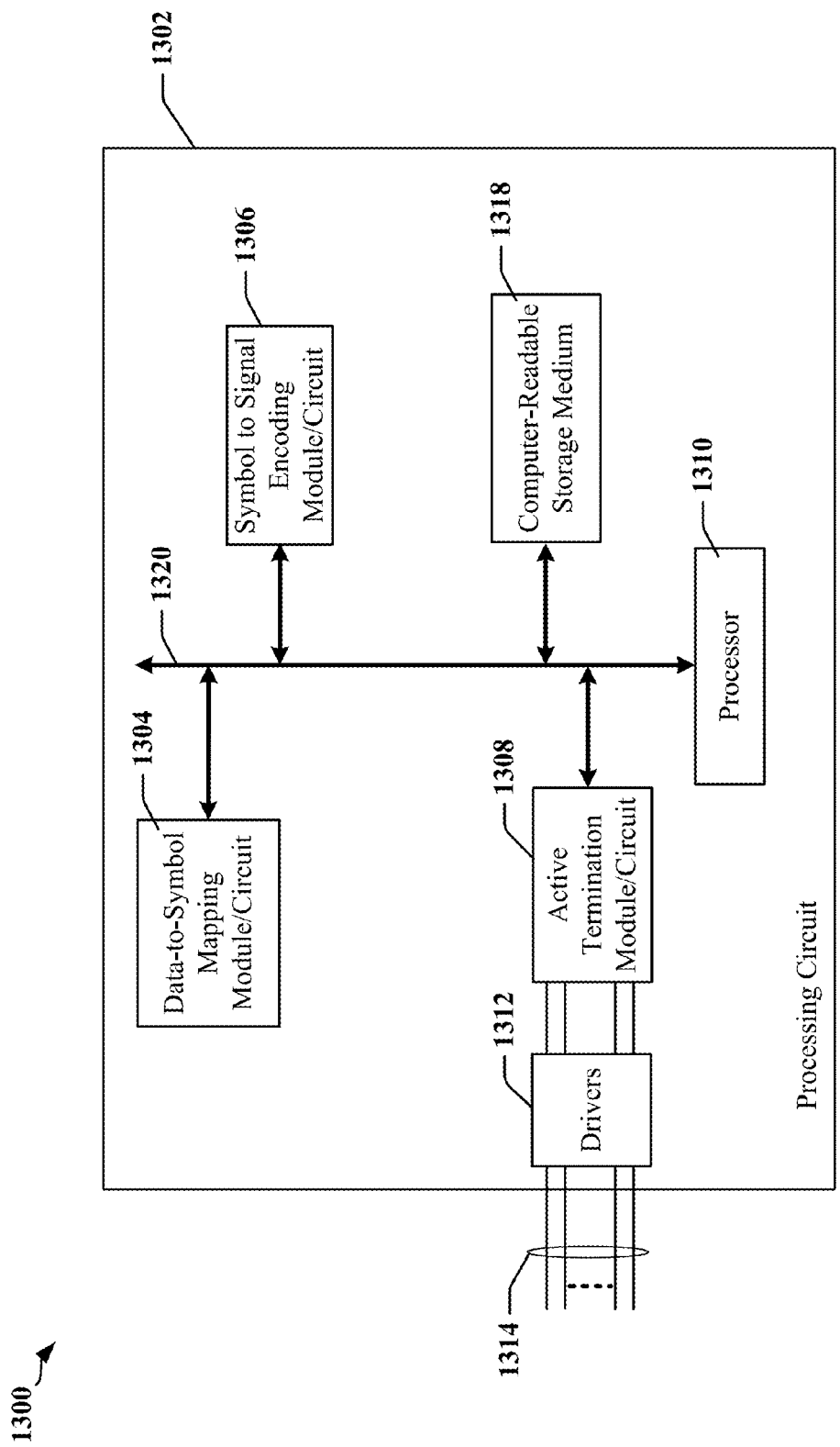
FIG. 13 is a diagram illustrating an example of a hardware implementation for a transmitter of an N-phase polarity encoded signal.

FIG. 13 is a diagram illustrating an example of a hardware implementation for an apparatus 1300 employing a processing system 1302. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1310, the modules 1304, 1306 and 1308, and the computer-readable medium 1318. The bus 1320 may also link various other circuits such as timing sources, peripherals, voltage regulators, and power management circuits, which are well known in the art, and therefore, will not be described any further.

The processing circuit 1302 may include or be coupled to line drivers 1312 and associated logic. The line drivers 1312 may is coupled to a plurality of wires 1314. The line drivers 1312 provide a means for communicating with various other apparatus over a bus. The processing circuit 1302 includes a processor 1310 coupled to a computer-readable medium 1318. The processor 1310 is responsible for general processing, including the execution of software stored on the computer-readable medium 1318. The software, when executed by the processor 1310, causes the processing circuit 1302 to perform the various functions described supra for any particular apparatus. The computer-readable medium 1318 may also be used for storing data that is manipulated by the processor 1310 when executing software. The processing system further includes at least one of the modules 1304, 1306 and 1308. The modules 1304, 1306 and 1308 may be software modules running in the processor 1310, resident/stored in the computer readable medium 1318, one or more hardware modules coupled to the processor 1310, or some combination thereof.

In one configuration, the apparatus 1300 includes a module, circuit or other means 1304 that is configured to map data to a sequence of symbols to be transmitted on a plurality of wires, a module, circuit or other means 1306 that is configured to encode the sequence of symbols in three signals, and a module, circuit or other means 1308 that is configured to cause the line drivers 1312 to drive each of three terminals in accordance with one of the three signals. In one example, the module, circuit or other means 1308 is configured to turn on a first transistor and turn off a second transistor when a corresponding one of the three signals is in a first phase, turn on the second transistor and turn off the first transistor when the corresponding one of the three signals is in a second phase, and turn off the first transistor and the second transistor when the corresponding one of the three signals is in a third phase.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A data transfer method comprising:
   mapping data to a sequence of symbols to be transmitted on a plurality of wires;
   encoding the sequence of symbols in three signals, wherein each of the three signals is in one of three phases for each symbol to be transmitted, and wherein the signals are in different phases from one another during transmission of each symbol; and
   driving each of three terminals in accordance with one of the three signals, wherein driving the each of the three terminals comprises:
   turning on a first transistor and turning off a second transistor when a corresponding one of the three signals is in a first phase, wherein the each of the three terminals is driven towards a first voltage level when the first transistor is turned on;
   turning on the second transistor and turning off the first transistor when the corresponding one of the three signals is in a second phase, wherein the each of the three terminals is driven towards a second voltage level when the second transistor is turned on;
   turning off the first transistor and the second transistor when the corresponding one of the three signals is in a third phase; and turning on a third transistor and turning on a fourth transistor when the corresponding one of the three signals is in the third phase, wherein the each of the three terminals is pulled towards a third voltage level when the third transistor is turned on and the fourth transistor is turned on.

2. The method of claim 1, wherein the third voltage level lies within a voltage range bounded by the first voltage level and the second voltage level.

3. The method of claim 1, wherein the third transistor is turned off and the fourth transistor is turned off when the corresponding one of the three signals is in the first phase or in the second phase.

4. The method of claim 1, wherein turning on the third transistor causes the each of the three terminals to be coupled to the first voltage through a first impedance, and turning on the fourth transistor causes the each of the three terminals to be coupled to the second voltage through a second impedance.

5. The method of claim 4, wherein the first impedance and the second impedance are selected to provide a desired impedance at the each of the three terminals.

6. The method of claim 1, wherein information is encoded in phase rotation at each transition between symbols in the sequence of symbols.

7. The method of claim 1, wherein for each symbol to be transmitted, two signals of the three signals are in the first phase or the second phase, and wherein information is encoded in relative polarity of the two signals.

8. An apparatus, comprising:
means for mapping data to a sequence of symbols to be transmitted on a plurality of wires;
means for encoding the sequence of symbols in three signals, wherein each of the three signals is in one of three phases for each symbol to be transmitted, and wherein the signals are in different phases from one another during transmission of each symbol; and
means for driving each of three terminals in accordance with one of the three signals, wherein the means for driving the each of the three terminals is configured to:
turn on a first transistor and turn off a second transistor when a corresponding one of the three signals is in a first phase, wherein the each of the three terminals is driven towards a first voltage level when the first transistor is turned on;
turn on the second transistor and turn off the first transistor when the corresponding one of the three signals is in a second phase, wherein the each of the three terminals is driven towards a second voltage level when the second transistor is turned on;
turn off the first transistor and the second transistor when the corresponding one of the three signals is in a third phase; and
turn on a third transistor and turn on a fourth transistor when the corresponding one of the three signals is in the third phase, wherein the each of the three terminals is pulled towards a third voltage level when the third transistor is turned on and the fourth transistor is turned on.

9. The apparatus of claim 8, wherein the third voltage level lies within a voltage range bounded by the first voltage level and the second voltage level.

10. The apparatus of claim 8, wherein the third transistor is turned off and the fourth transistor is turned off when the corresponding one of the three signals is in the first phase or in the second phase.

11. The apparatus of claim 8, wherein the each of the three terminals is coupled to the first voltage through a first impedance when the third transistor is turned on, and the each of the three terminals is coupled to the second voltage through a second impedance when the fourth transistor is turned on.

12. The apparatus of claim 11, wherein the first impedance and the second impedance are selected to provide a desired impedance at the each of the three terminals.

13. The apparatus of claim 8, wherein information is encoded in phase rotation at each transition between symbols in the sequence of symbols.

14. The apparatus of claim 8, wherein for each symbol to be transmitted, two signals of the three signals are in the first phase or the second phase, and wherein information is encoded in relative polarity of the two signals.

15. A transmitter, comprising:
a plurality of terminals driven by line drivers; and
a processing circuit configured to:
map data to a sequence of symbols to be transmitted on a plurality of wires; and
encode the sequence of symbols in three signals, wherein each of the three signals is in one of three phases for each symbol to be transmitted, and wherein the signals are in different phases from one another during transmission of each symbol; and
a line driver configured to drive one of three terminals in accordance with one of the three signals, wherein driving the one of the three terminals comprises:
turning on a first transistor and turning off a second transistor when a corresponding one of the three signals is in a first phase, wherein the one of the three terminals is driven towards a first voltage level when the first transistor is turned on;
turning on the second transistor and turning off the first transistor when the corresponding one of the three signals is in a second phase, wherein the one of the three terminals is driven towards a second voltage level when the second transistor is turned on;
turning off the first transistor and the second transistor when the corresponding one of the three signals is in a third phase; and
turning on a third transistor and turning on a fourth transistor when the corresponding one of the three signals is in the third phase, wherein the one of the three terminals is pulled towards a third voltage level when the third transistor is turned on and the fourth transistor is turned on.

16. The transmitter of claim 15, wherein the third voltage level lies within a voltage range bounded by the first voltage level and the second voltage level.

17. The transmitter of claim 15, wherein the third transistor is turned off and the fourth transistor is turned off when the corresponding one of the three signals is in the first phase or in the second phase.

18. The transmitter of claim 15, wherein the each of the three terminals is coupled to the first voltage through a first impedance when the third transistor is turned on, and the each of the three terminals is coupled to the second voltage through a second impedance when the fourth transistor is turned on.

19. The transmitter of claim 18, wherein the first impedance and the second impedance are selected to provide a desired impedance at the each of the three terminals.

20. The transmitter of claim 15, wherein information is encoded in phase rotation at each transition between symbols in the sequence of symbols.

21. The transmitter of claim 15, wherein for each symbol to be transmitted, two signals of the three signals are in the first phase or the second phase, and wherein information is encoded in relative polarity of the two signals.

22. A non-transitory processor-readable storage medium having one or more instructions which, when executed by at least one processing circuit, cause the at least one processing circuit to:
  map data to a sequence of symbols to be transmitted on a plurality of wires;
  encode the sequence of symbols in three signals, wherein each of the three signals is in one of three phases for each symbol to be transmitted, and wherein the signals are in different phases from one another during transmission of each symbol; and
  drive each of three terminals in accordance with one of the three signals by:
    turning on a first transistor and turning off a second transistor when a corresponding one of the three signals is in a first phase, wherein the each of the three terminals is driven towards a first voltage level when the first transistor is turned on;
    turning on the second transistor and turning off the first transistor when the corresponding one of the three signals is in a second phase, wherein the each of the three terminals is driven towards a second voltage level when the second transistor is turned on;
    turning off the first transistor and the second transistor when the corresponding one of the three signals is in a third phase; and
    turning on a third transistor and turning on a fourth transistor when the corresponding one of the three signals is in the third phase, wherein the each of the three terminals is pulled towards a third voltage level when the third transistor is turned on and the fourth transistor is turned on.

23. The storage medium of claim 22, wherein the third voltage level lies within a voltage range bounded by the first voltage level and the second voltage level.

24. The storage medium of claim 22, wherein the third transistor is turned off and the fourth transistor is turned off when the corresponding one of the three signals is in the first phase or in the second phase.

25. The storage medium of claim 22, wherein the each of the three terminals is coupled to the first voltage through a first impedance when the third transistor is turned on, and the each of the three terminals is coupled to the second voltage through a second impedance when the fourth transistor is turned on.

26. The storage medium of claim 25, wherein the first impedance and the second impedance are selected to provide a desired impedance at the each of the three terminals.

27. The storage medium of claim 22, wherein information is encoded in phase rotation at each transition between symbols in the sequence of symbols.

28. The storage medium of claim 22, wherein for each symbol to be transmitted, two signals of the three signals are in the first phase or the second phase, and wherein information is encoded in relative polarity of the two signals.

* * * * *